Jan. 29, 1974 D. R. WHITEMAN Re. 27,905

GRAPPLER-SPREADER FOR CANTILEVER-BOOM TRUCKS

Original Filed Dec. 15, 1969 2 Sheets-Sheet 1

INVENTOR.
DONALD R. WHITEMAN
BY
M Potts
ATTORNEY

GRAPPLER-SPREADER FOR CANTILEVER-BOOM TRUCKS

Original Filed Dec. 15, 1969 2 Sheets-Sheet 2

INVENTOR.
DONALD R. WHITEMAN

BY

M. Porter
ATTORNEY

United States Patent Office

Re. 27,905

Reissued Jan. 29, 1974

27,905

GRAPPLER-SPREADER FOR CANTILEVER-BOOM TRUCKS

Donald R. Whiteman, Roxboro, N.C., assignor to Midland-Ross Corp., Cleveland, Ohio Original No. 3,606,053, dated Sept. 20, 1971, Ser. No. 884,986, Dec. 15, 1969. Application for reissue Apr. 12, 1972, Ser. No. 243,484

Int. Cl. B66c *1/30*

U.S. Cl. 214—147 G 11 Claims

Matter enclosed in heavy brackets [ ] appears in the original patent but forms no part of this reissue specification; matter printed in italics indicates the additions made by reissue.

ABSTRACT OF THE DISCLOSURE

An expandable spreader and grappling device, termed herein a grappler-spreader, for top-lifting cargo containers and bottom-lifting containers, piggy-back trailers, etc. particularly adapted for use on large front or side lift trucks or other vehicles which provide a centilever-type lifting boom. For bottom-lifting, the device necessarily has grappling arms which are retractable in order that the top-lifting mechanism may be used more effectively. In the present instance, the arms, which are on the side of the spreader toward the supporting vehicle, are shortenable to a length within the height of a container.

In utilizing cantilever-boom type vehicles for operating bottom and top-lifting devices, a grappler-spreader of the type illustrated in [patent application Ser. No. 765,404 now] *U.S.* Pat. No. 3,558,176 [filed by coapplicants including the present applicant] is not quite suitable because of difficulties which arise in the stowage of grappling arms which are moved to storage or operative position by swinging the arms about axes which extend transversely of the spreader length to positions wherein the arms extend about horizontally lengthwise of both sides of the main frame and chassis of the grappler-spreader. It may be noted that in adapting front or side loading trucks to piggyback trailer handling the distance of the center of gravity of the load from the nearest wheels on the ground of the truck is of critical importance in determining the size of the truck. For example, reduction of this distance by one inch is economically significant.

In general, the structure of such trucks is related to the length of a grappler-spreader so that the side or end of the truck is shorter than the distance between grappling arms at one side of the grappler-spreader and may thus project into the region between the arms. This arrangement allows the load carried by the grappler-spreader to be carried in close proximity to the truck body, but prevents swinging of the grappling arms toward each other and to a position on a level with the grappler-spreader chassis. Even when the grappler-spreader is spaced outwardly from the truck body sufficiently to receive the grappling arms therebetween, there is a further difficulty of positioning the arms above the top-lifting latching structure because of the overhanging boom structure connecting with the grappler-spreader. Notwithstanding this situation, [if] *it* is definitely advantageous to have the arms on the remote side of the grappler-spreader capable of swinging upwardly into inoperative positions alongside the spreader chassis, in order that a front or side-loading truck may move into loading position beside a piggyback trailer from a lateral direction.

Hence, it is a principal object of this invention to provide a grappler-spreader that is practical and convenient for use in self-propelled cantilever-lifting type vehicles, particularly those vehicles which are steerable and are mounted on resilient tires for movement over the ground or pavement.

An object ancillary to the above object is to provide grappler-spreader design complementary to the structure of the supporting vehicle permitting a load, typically a cargo container or piggyback trailer, to be supported as closely as possible to the wheels, or other supporting components of the vehicle, engaging the ground, in order to advantageously utilize the weight of the supporting vehicle.

In fulfilling these and other objects a grappler-spreader is provided which comprises a generally rectangular frame having means adapting it for attachment to a boom connecting therewith and extending in cantilever arrangement from a supporting vehicle, top pickup mechanism normally comprising four latching devices depending from the frame or an intervening supporting means for the purpose of interlocking with receptacles in the top portion of a cargo container; and bottom pickup mechanism comprising four pickup or grappling arms pivoted from the frame or intervening support means at four locations in spaced, normally-symmetrical relation with the normally-longitudinal or horizontal and transverse axes of the frame.

In the preferred embodiment, all of said arms are swingable in the longitudinal direction of the frame and swingable toward and away from the region in which a load is received by the grappler-spreader. The pair of arms on the side of the spreader toward a supporting vehicle therefor is arranged in longitudinally-adjustable guide relationship and *includes* means for securing the portions at different overall lengths of the arms. The grappler-spreader further includes power devices for swinging the pair of arms which are mounted in farside relation with a supporting vehicle to a raised, *angularly-retracted*, generally horizontal position *alongside the frame* facilitating horizontal movement of a grappler-spreader over the top of the container.

In the drawing with respect to which the invention is described:

Figures 1, 2:
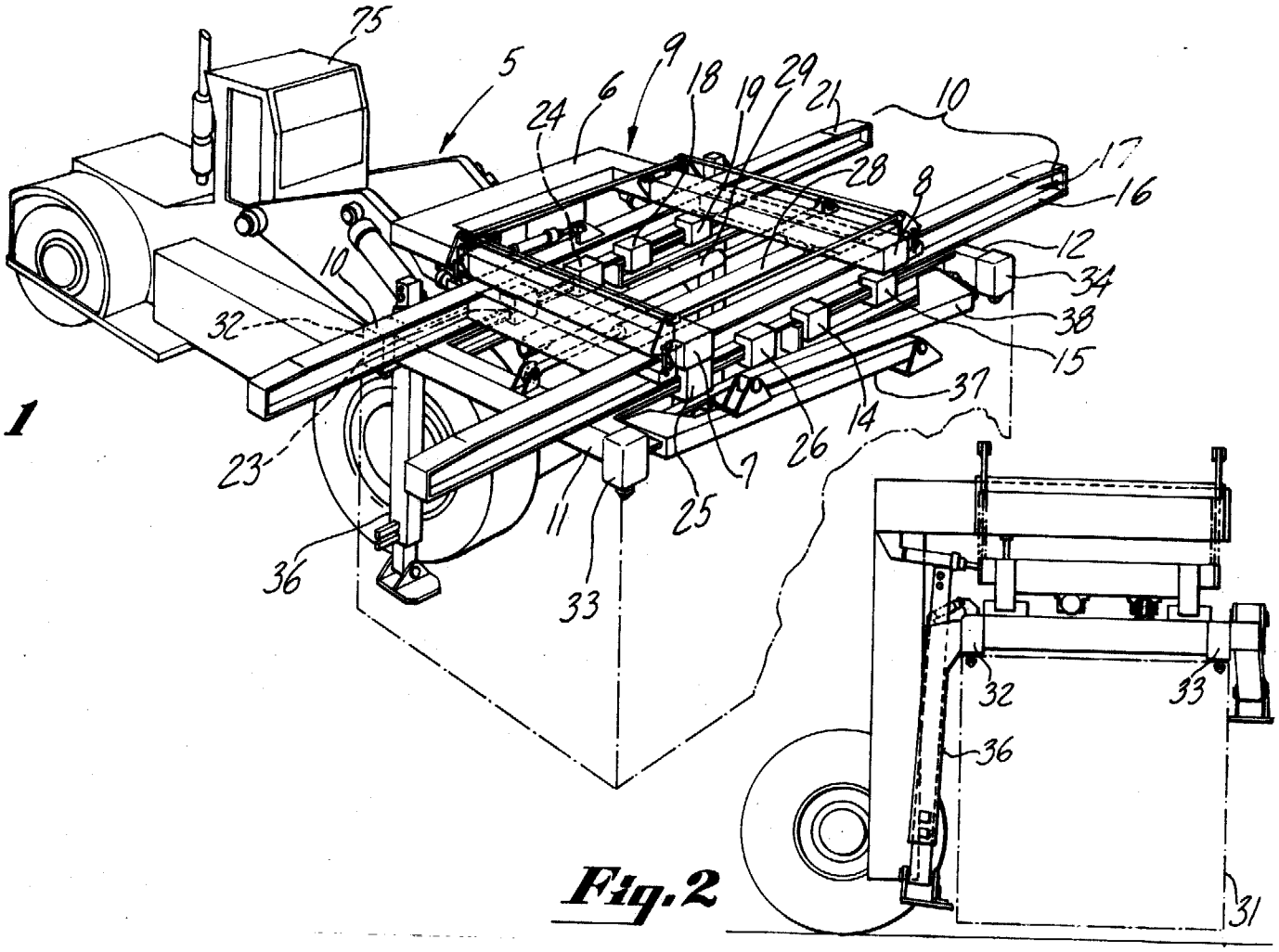
FIG. 1 is a perspective view of a grappler-spreader constructed with its shortenable grappling arms in shortened condition for a top-lifting operation and shown mounted on a front lift truck.
FIG. 2 is an end view illustrating the grappler-spreader of FIG. 1 along with portions of the truck and in top-lifting condition.

FIGS. 1 and 2 depict a front lift truck 5 of known construction having a vertically-adjustable boom 6 of bifurcate design comprising forked tines 7, 8 on which the grappler-spreader 9 is supported.

In the embodiment shown, the spreader 9 comprises a maine frame 10 and subframes 11, 12 suspended on the main frame in longitudinally-movable guide relation therewith. For example, the subframe has C-shaped bearing blocks 14, 15 fixed to a longitudinal rail of the subframe in slidable gripping relation with the lower flange of a longitudinal rail 16 of the main frame. In a like manner, the opposite longitudinal subframe member has blocks 18, 19 fixed thereto and slidable along the lower range of main frame rail 21. A similar relationship is established between subframe 11 and the main frame by bearing blocks 23, 24, 25, 26. Suitable control means is provided to permit a hydraulic cylinder 28 connected between the main frame and subframe 11 and a hydraulic cylinder 29, connected between the main frame and subframe 12, to traverse the subframes simultaneously relative to the main frame when adjusting the grappler-spreader for picking up loads of different length. The grappler-spreader 3 is shown in FIG. 1 in a condition wherein the subframes are disposed inwardly toward each other at positions permitting the spreader to pick up a cargo container 31 of approximately the minimum length which will permit the spreader to connect with a container. The subframes are provided at longitudinally-outward corners with latching mechanisms 32, 33, 34 of known construction, typified by the standard twist-lock mechanism in common use.

Figure 4:
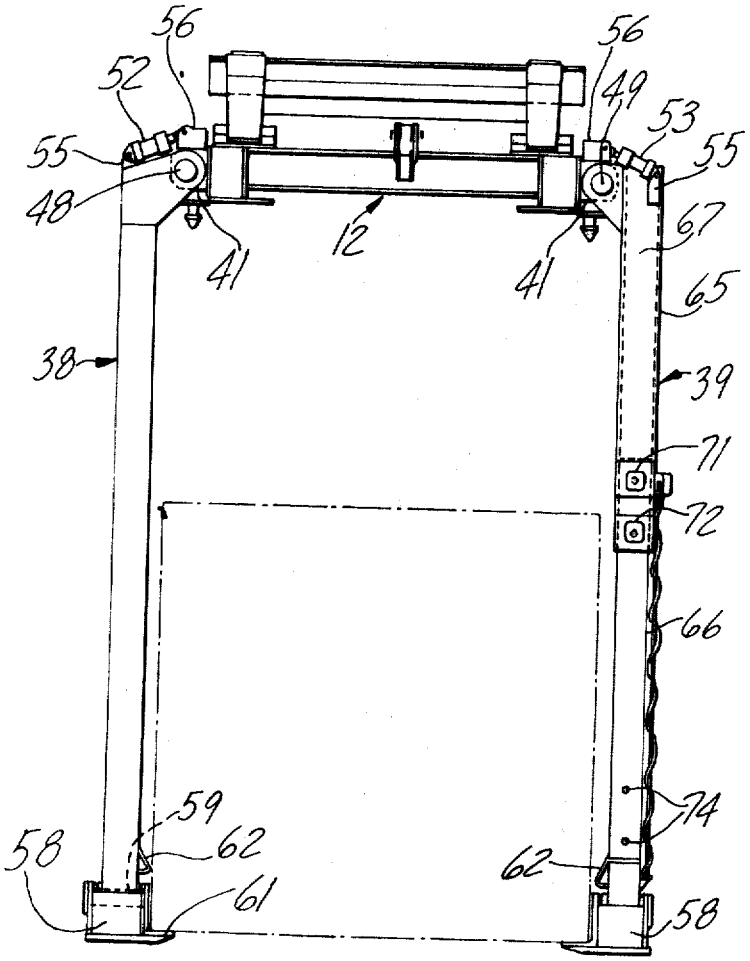
FIG. 4 is an end view of the grappler-spreader as shown in FIG. 3 with the shortenable legs, which are adjacent the [left] *lift* truck, extended to full length.

For the purpose of picking up piggyback trailers or other types of rigid box-like loads adaptable to bottom lifting, each subframe has pivotally mounted thereon a pair of grappling arms, e.g., arms 36, 37 of subframe 11. In a like manner, the subframe 12 supports arms 38, 39 as shown in FIG. 4. In this figure, the arms 38, 39, typifying all of the arms of the spreader, are shown in bottom-load lifting position with the arm 39 fully elongated as compared with the shortened condition shown in FIG. 1 (see arm 36). The arms 36 and 39 terminate in the manner illustrated by FIG. 5 in a knuckle having a cylindrical journal 42 received in suitable bearings 43, 44 fixed in a longitudinal member 45 of the subframes 11 or 12. The axis 46 of the journal extends in a transverse horizontal direction of the spreader in each case. This permits swinging of the arms in planes extending longitudinally of the spreader. The arms are enabled to swing in planes extending transversely of the spreader by being hinged on pins such as pins 48, 49 of legs 38, 39, or pin 51 shown in FIG. 5 as extending through a hub portion of the knuckle 41. To effect motion about such pins, hydraulic cylinders, e.g., cylinders 52, 53 are pivotally connected to the fixtures on each arm at one end and on the supporting knuckle at the other end for swinging the arm toward and away from the region between opposite arms in which a load is received. Such fixtures are typified by a clevis 55 on the arm 38 and another clevis 56 on the knuckle 41, on which the arm pivots.

Considering arm 38 as typical of the other three grappling arms except for shortenability structure, it will be noted that the arm comprises a hand element 58 having a pin 59 placing the element 58 in journal-bearing relation with the distal end portion of the same portion of the arm. The element further comprises a wide flat finger 61 adapted to reach under a lower corner portion of a container or trailer. A blunt-shaped projection 62 is secured to each shank of a grappling arm along the surface thereof facing into the load-receiving region.

Figure 3:
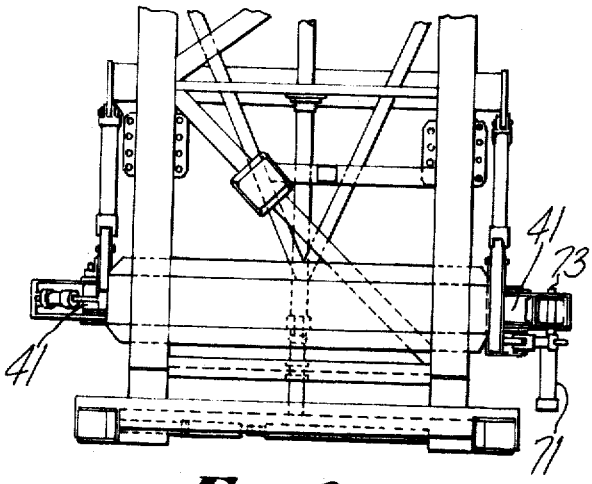
FIG. 3 is a fragmentary plan view of the spreader shown in FIGS. 1 and 2 with the boom of the truck removed.

As this invention is concerned essentially with a grappler-spreader having shortenable arms adapting it for use on vehicles providing cantilever-boom support, the structure of shortenable arms 36, 39 is now considered. Each arm 36, 39 comprises telescoping sections 65, 66 of which section 66 is received in section 65. On a lower portion of a longitudinally-facing surface 67, positioning or locking mechanism is fixed to the section 65 comprising a pair of cylinders 71, 72, each of which supports a locking pin, such as pin 73 of cylinder 71 (FIG. 3) connected coaxially with or forming a portion of the piston rod of cylinder 71. Such pin extends in each instance through holes of arm sections 65, 66 in registry at the extended and retracted conditions of the arms 36, 39. Suitable control for operating the cylinders 71, 72 is provided, e.g., in the cab 75 of the truck 5.

In preparing the arms 36, 39 for bottom-lifting use as shown in FIG. 4, and assuming the arms to be in their shortened condition as shown in FIG. 1, the spreader may be maneuvered by the truck to a position wherein the hand elements 58 of the arms 36, 39 rest upon a suitable surface. Such surface may be the ground or pavement. With the non-shortenable arms 37, 38 retracted as shown in FIG. 1, the pins of cylinders 71, 72 extend through apertures 74 in the lower portion of the lower section 66. The cylinders 71, 72 are actuated to withdraw the pins from locking position, whereupon the spreader in its entirety may be raised. The section 66 slides downwardly relative to section 65 until registry of apertures in the upper portions of section 66 is reached with apertures in the arm section 65. At this point, the cylinders 71, 72 are actuated to insert the pins thereof through both sections of the arms 36, 39 to lock them in extended condition. The grappler-spreader is in condition for a bottom-lifting operation as soon as the non-extendable arms 37, 38 are lowered to a position such as shown in FIG. 4. Retraction or shortening of the arms 36, 39 is accomplished by reversing the procedure just described.

Figure 6:
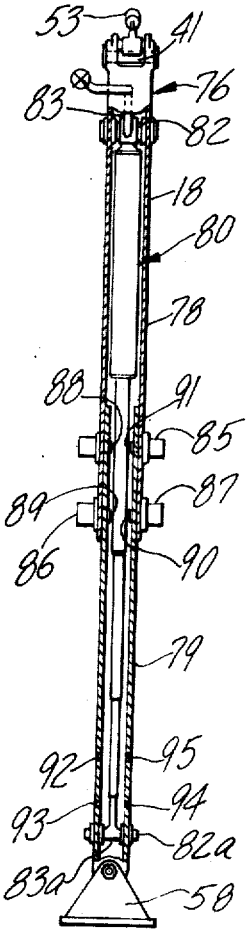
FIG. 6 is a side elevation in section of a modified grappling arm extended to full length shown with the portions of the four side walls of telescoping sections removed to expose interior mechanism.

FIG. 6 illustrates a modified shortenable grappling arm 76 supported on a knuckle 41 in the same manner as disclosed with respect to the earlier described grappling arms. The arms 76 comprises an upper section 78 and a lower section 79 movable into section 78 in telescoping relation therewith. The arm may be lengthened or shortened by a multi-stage articulated hydraulic cylinder 80 shown with four stages. The upper end of the cylinder is anchored to an upper portion of the arm section 78 in journal-bearing relation therewith by a pin 82 which extends through bearings in the section walls and a hub 83 of the cylinder. A similar type connection is established between the lower end of the cylinder 80 and the lower end of the lower section 79 by a pin 82a and hub portion 83a of the cylinder. Fluid cylinders 84, 85, 86 and 87 insert pins 88 to 91, respectively, through and withdraw them from registering apertures in the walls of arm sections 78, 79 at both the extended and shortened conditions of the arm. Apertures 92, 93, 94 and 95 receive the pins at the shortened condition of the arm.

Figure 5:
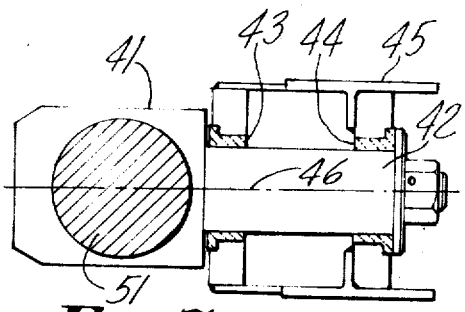
FIG. 5 is an elevational view of a pivot joint for connecting a grapple arm to a sub-frame with portions vertically sectioned to expose the journal of a pivotable knuckle.

The foregoing description discloses a container or trailer lifting implement which, because of its structure and top-lifting and bottom-lifting capabilities, is conveniently named a grappler-spreader. The usefulness of this spreader in combination with front loading or side loading vehicles arises primarily out of the shortenable grapple arms disposed along the side of the grappler-spreader nearer to the vehicle providing cantilever support. Usefulness to a considerable extent arises out of the fact that the grapple arms on the near side are axially and pivotably independent of the arms on the far side of the implement, in order that the far-side arms may be raised to a horizontal position while the near-side arms remain pendent. FIG. 5 illustrates a type of grapple arm attachment to the spreader frame by which each arm is made pivotally independent of the others.

What is claimed is:

1. Equipment for handling cargo containers including a spreader comprising:

a generally rectangular base frame centered with respect to a longitudinal normally-horizontal axis and a tranverse normally-horizontal axis;

top pickup mechanism comprising four latching means connected by supporting means therefor to the frame disposed in spaced normally-symmetrical relation with respect to the intersection of said axes, said latching means being simultaneously interlockable with similarly-disposed means in the top portion of a container;

bottom pickup mechanism comprising four pickup arms attached to said frame by independently pivotable pivot means at four locations in spaced normally-symmetrical relation with respect to said intersection;

a first pair of said arms at one side of said longitudinal axis being pivotable toward and away from a vertical longitudinal plane of the frame and shortenable along respective lengths; and the other of arms being [pivotable toward and away from both vertical and longitudinal planes] *swingable in planes extending transversely and planes extending longitudinally of the spreader,* and [swingable] upwardly to angularly-retracted positions alongside said frame.

2. The equipment of claim 1 wherein:

said shortenable arms comprise telescoping sections of which one section is movable within another to define a predetermined range of shortening for said legs, and means for interlocking respective telescopic sections to fix the lengths of said arms at both extremities of said range.

3. The equipment of claim 2 wherein:

said interlocking means consists of holes in the telescoping sections of each arm in registry at both ends of said range and pin means insertable through said holes.

4. The equipment of claim 1 wherein:

each shortenable arm comprises an outer hollow section supported by one of said pivot means and an inner section in telescopic relation therewith and having holes in registry with holes of said outer section at opposite ends of a desired range of shortening; and said arm comprises pin means and power actuating means therefor carried on the outer section.

5. The equipment of claim 1 wherein:

said shortenable arms comprise telescoping sections, stop means on said arms defining a range of shortening and lengthening of said arms and power means acting between said sections of an arm to lengthen and shorten the arm.

6. The equipment of claim 1 comprising:

a vehicle having a boom attaching to an upper portion of said frame in cantilever relation therewith, said boom being movable in a vertical direction to lower said spreader relative to a ground or other reference surface contacted by distal extremities of said shortenable arms through substantially the shortening range of said arms to effect shortening thereof.

7. The equipment of claim 6 comprising:

a pair of carriages mounted on said frame in slidable guide relation therewith for movement in the longitudinal direction of the frame, each carriage having attached thereto a pair of said latching means and a pair of said pivot means with associated pickup arms.

*8. Equipment for handling cargo containers including a spreader comprising:*

*a generally rectangular base frame centered with respect to a longitudinal normally-horizontal axis and a transverse normally-horizonal axis;*

*top pickup mechanism comprising four latching means connected by supporting means therefor to the frame*

*disposed in spaced normally-symmetrical relation with respect to the intersection of said axes, said latching means being simultaneously interlockable with similarly-disposed means in the top portion of a container;*

*bottom pickup mechanism comprising four pickup arms attached to said frame at four locations in spaced normally-symmetrical relation with respect to said intersection;*

*a first pair of said arms at one side of said longitudinal axis always being pendent relative to said frame and shortenable along respective lengths; and*

*the other pair of arms being of fixed length and attached by independently pivotable pivot means to the frame, said pivot means enabling swinging movements of said arms in planes extending transversely and planes extending longitudinally of the spreader to enable said arms attached by the pivot means to swing upwardly to angularly retracted positions alongside the frame.*

*9. The equipment of claim 8 comprising:*

*independent pivot means for each of said first pair of arms enabling swinging movements thereof in planes transversely of the spreader.*

*10. The equipment of claim 8 wherein:*

*each shortenable arm comprises an outer hollow section and an inner section in telescopic relation therewith, and detent means for fixing the position of one of said sections with respect to the length of the other section.*

*11. The equipment of claim 8 wherein:*

*each shortenable arm comprises two sections in longitudinal guide relationship, and power means connecting with and acting between said sections to lengthen or shorten the arm.*

References Cited

The following references, cited by the Examiner, are of record in the patented file of this patent or the original patent.

UNITED STATES PATENTS

| | | | |
|---|---|---|---|
| 3,161,309 | 12/1964 | Baudhuin et al. | 294—67 BC X |
| 3,251,496 | 5/1966 | Lamer et al. | 214—392 |
| 3,558,172 | 1/1971 | Lamer et al. | 214—392 |
| 3,558,176 | 1/1971 | Fathauer et al. | 294—67 R |
| 3,458,229 | 7/1969 | Nagy et al. | 297—67 BC |
| 3,243,224 | 3/1966 | Gutridge | 294—81 S F X |
| 3,448,874 | 6/1969 | Martinson | 214—77 R X |

ROBERT J. SPAR, Primary Examiner

U.S. Cl. X.R.

214—392, 621; 294—67 DA, 67 DB, 81 SF

PO-1050
(5/69)

UNITED STATES PATENT OFFICE
CERTIFICATE OF CORRECTION

Patent No. Reissue 27905 Dated January 29, 1974

Inventor(s) Donald R. Whiteman

It is certified that error appears in the above-identified patent and that said Letters Patent are hereby corrected as shown below:

Column 2, line 66, "maine" should be -- main --.

Column 5, line 3, between "other" and "of" insert -- pair --.

Signed and sealed this 2nd day of July 1974.

(SEAL)
Attest:

EDWARD M.FLETCHER,JR.
Attesting Officer

C. MARSHALL DANN
Commissioner of Patents